US012602822B2

(12) United States Patent
Wen

(10) Patent No.: US 12,602,822 B2
(45) Date of Patent: Apr. 14, 2026

(54) METHOD DEVICE AND STORAGE MEDIUM FOR BACK-END OPTIMIZATION OF SIMULTANEOUS LOCALIZATION AND MAPPING

(71) Applicant: Beijing Zitiao Network Technology Co., Ltd., Beijing (CN)

(72) Inventor: Jiawei Wen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 306 days.

(21) Appl. No.: 18/569,692

(22) PCT Filed: May 23, 2022

(86) PCT No.: PCT/CN2022/094529
§ 371 (c)(1),
(2) Date: Dec. 13, 2023

(87) PCT Pub. No.: WO2023/279867
PCT Pub. Date: Jan. 12, 2023

(65) Prior Publication Data
US 2024/0221210 A1 Jul. 4, 2024

(30) Foreign Application Priority Data
Jul. 7, 2021 (CN) ......................... 202110766196.5

(51) Int. Cl.
G06T 7/73 (2017.01)
(52) U.S. Cl.
CPC ...... G06T 7/73 (2017.01); G06T 2207/10016 (2013.01)

(58) Field of Classification Search
CPC ............. G06T 7/73; G06T 2207/10016; G06T 2207/30244; G06T 7/579; G06T 19/20; G06T 7/75; G06T 2219/2004
See application file for complete search history.

(56) References Cited

U.S. PATENT DOCUMENTS

2020/0005487 A1* 1/2020 Jiang ........................ G06T 7/74
2020/0134847 A1 4/2020 Gros
(Continued)

FOREIGN PATENT DOCUMENTS

CN 106846467 A 6/2017
CN 108428249 A 8/2018
(Continued)

OTHER PUBLICATIONS

Zhentao et al, ("High-Precision Visual Localization and Dense Mapping Based on Visual SLAM for Indoor Environment", 2019 IEEE 5 th International Conference on Computer and Communications, pp. 377-381) (Year: 2019).*
(Continued)

*Primary Examiner* — Amara Abdi
(74) *Attorney, Agent, or Firm* — Astute IP Law Group

(57) ABSTRACT

The disclosure provides a method, device and storage medium for back-end optimization of simultaneous localization and mapping. In the method, a target three-dimensional space point is determined in three-dimensional space points of a plurality of key frames located by a simultaneous localization and mapping system. In addition, a reprojection error is determined based on the target three-dimensional space point, and a weight is provided for the reprojection error by preprocessing the maximum parallax corresponding to the target three-dimensional space point, to obtain the relative reprojection error.

20 Claims, 5 Drawing Sheets

(56) References Cited

U.S. PATENT DOCUMENTS

| | | | | |
|---|---|---|---|---|
| 2021/0082137 A1* | 3/2021 | Wang | .......................... | G06T 7/74 |
| 2021/0125397 A1* | 4/2021 | Moulon | ................... | G06T 17/00 |
| 2021/0150755 A1* | 5/2021 | Gao | ........................... | G06T 7/73 |
| 2022/0051431 A1* | 2/2022 | Jagadeesan | ............. | G06V 10/98 |
| 2022/0358262 A1* | 11/2022 | Jeon | ........................... | G06T 7/73 |
| 2023/0005220 A1* | 1/2023 | Yoshikawa | ............ | H04N 23/64 |
| 2024/0104771 A1* | 3/2024 | Zelek | ...................... | G06T 7/579 |

FOREIGN PATENT DOCUMENTS

| | | | | | |
|---|---|---|---|---|---|
| CN | 109887087 | A | 6/2019 | | |
| CN | 109934862 | A | 6/2019 | | |
| CN | 110044354 | A | 7/2019 | | |
| CN | 111583331 | A | 8/2020 | | |
| CN | 112734839 | * | 4/2021 | ............. | G06F 18/22 |
| CN | 112734839 | A | 4/2021 | | |
| CN | 112767481 | A | 5/2021 | | |
| CN | 112819860 | * | 5/2021 | ............... | G06T 7/80 |
| CN | 112819860 | A | 5/2021 | | |
| WO | 2018/129715 | A1 | 7/2018 | | |

OTHER PUBLICATIONS

International Search Report (with English translation) and Written Opinion issued in PCT/CN2022/094529, dated Aug. 9, 2022, 8 pages provided.
Office Action for Chinese Patent Application No. 202110766196.5, mailed on Nov. 27, 2025, 18 pages.

\* cited by examiner

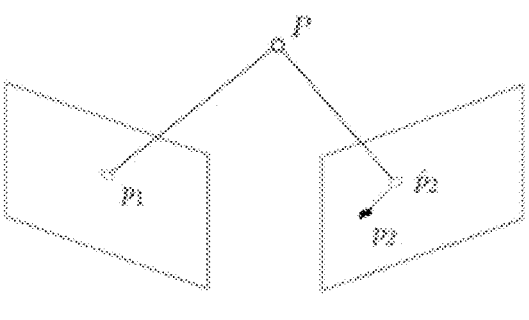

FIG. 3

DETERMINE A TARGET THREE-DIMENSIONAL SPACE POINT IN THREE-DIMENSIONAL SPACE POINTS OF A PLURALITY OF KEY FRAMES LOCATED BY A SIMULTANEOUS LOCALIZATION AND MAPPING SYSTEM ⌐ S401

DETERMINE A REPROJECTION ERROR BASED ON THE TARGET1 THREE-DIMENSIONAL SPACE POINT ⌐ S402

DETERMINE A PLURALITY OF TARGET KEY FRAMES CORRIESPONDING TO THE TARGET THREE-DIMENSIONAL SPACE POINT ⌐ S403

DETERMINE A PLURALITY OF PARALLAXES CORRESPONDING TO THE TARGET THREE-DIMENSIONAL SPACE POINT AFTER THE PREPROCESSINGBASED ON KEY POINT COORDINATES OF A KEY FRAME UI, KEY POINT COORDINATES OF A KEY FRAME UJ, AN INTRINSIC MATRIX OF AN IMAGE OBTAINING APPARATUS IN THE SIMULTANEOUS LOCALIZATION AND MAPPING SYSTEM, AND A ROTATION MATRIX OF THE KEEY FRAME UJ TO THE KEY FRAME UI, WHEREIN THE KEY FRAMES UI AND UJ ARE ANY TWO OF THE PLURALITY OF TARGET KEY FRAMES, I=1, 2, ... M, J=1, 2, ... M, AND MIS EQUAL TO THE NUMBER OF THE PLURALITY OF TARGET KEY FRAMES ⌐ S404

DETERMINE THE MAXIMUM PARALLAX FROM THE PLURALITY CF PARALLAXES CORRESPONDING TO THE TARGET THREE-DIMENSIONAL SSPACE POINT AFTER THE PREPROCESSING ⌐ S405

DETERMINE A RELATIVE REPROJECTION ERROR BASED ON THEREPROJECTION ERROR AND THE MAXIMUM PARALLAX ⌐ S406

PERFORM BACK-END OPTIMIZATION TO THE SIMULTANEOUS LLOCALIZATION AND MAPPING SYSTEM BASED ON THE RELATIVE REPROJECTIOON ERROR ⌐ S407

FIG. 4

METHOD DEVICE AND STORAGE MEDIUM FOR BACK-END OPTIMIZATION OF SIMULTANEOUS LOCALIZATION AND MAPPING

The present application claims priority to Chinese Patent Application No. 202110766196.5 filed on Jul. 7, 2021, entitled "METHOD, APPARATUS AND STORAGE MEDIUM FOR BACK-END OPTIMIZATION OF SIMULTANEOUS LOCALIZATION AND MAPPING" the contents of which are incorporated herein by reference in their entireties.

FIELD

The present application relates to the field of image processing, and in particular to, a method, apparatus and storage medium for back-end optimization of simultaneous localization and mapping.

BACKGROUND

With the development of computer vision technology, simultaneous localization and mapping algorithms are widely used in such fields as augmented reality, virtual reality, automatic driving and positioning and navigation of robots or drones.

Simultaneous localization and mapping algorithms may be divided into front-end and back-end two parts. The main role of the front end is to calculate the relative relationship between frames, such as calculating the relative pose between frames. The role of the back end is mainly to optimize output results of the front end to obtain the optimum pose estimation. In methods of visual simultaneous localization and mapping, the back-end optimization generally takes the reprojection error between a frame and frame matching key points as a loss function, and then performs overall optimization based on the loss function. For example, when the loss function is small, the optimized pose estimation may be obtained.

SUMMARY

The present application provides a method, device, and storage medium for back-end optimization of simultaneous localization and mapping.

In a first aspect, embodiments of the present application provide a method of back-end optimization of simultaneous localization and mapping, comprising:

determining a target three-dimensional space point in three-dimensional space points of a plurality of key frames located by a simultaneous localization and mapping system;

determining a reprojection error based on the target three-dimensional space point;

determining a relative reprojection error based on the reprojection error and a maximum parallax corresponding to the target three-dimensional space point after preprocessing, the preprocessing comprising an operation of removing influence of rotation; and performing back-end optimization to the simultaneous localization and mapping system based on the relative reprojection error.

In a possible implementation, before the determining a relative reprojection error based on the reprojection error and a maximum parallax corresponding to the target three-dimensional space point after preprocessing, further comprising:

determining a plurality of target key frames corresponding to the target three-dimensional space point;

determining a plurality of parallaxes corresponding to the target three-dimensional space point after the preprocessing based on key point coordinates of a key frame ui, key point coordinates of a key frame uj, an intrinsic matrix of an image obtaining apparatus in the simultaneous localization and mapping system, and a rotation matrix of the key frame uj to the key frame ui, wherein the key frames ui and uj are any two of the plurality of target key frames, i=1, 2, . . . m, j=1, 2, . . . m, and m is equal to the number of the plurality of target keyframes; and determining the maximum parallax from the plurality of parallaxes corresponding to the target three-dimensional space point after the preprocessing.

In a possible implementation, the determining a plurality of parallaxes corresponding to the target three-dimensional space point after the preprocessing based on key point coordinates of a key frame ui, key point coordinates of a key frame uj, an intrinsic matrix of an image obtaining apparatus in the simultaneous localization and mapping system, and a rotation matrix of the key frame uj to the key frame ui comprises:

calculating a product of the intrinsic matrix, the rotation matrix, an inverse matrix of the intrinsic matrix, and the key point coordinates of the key frame uj; and determining the plurality of parallaxes corresponding to the target three-dimensional space point after the preprocessing based on a difference between the key point coordinates of the key frame ui and the product.

In a possible implementation, the determining a relative reprojection error based on the reprojection error and a maximum parallax corresponding to the target three-dimensional space point after preprocessing comprises:

calculating a ratio of the reprojection error to the maximum parallax; and determining the ratio as the relative reprojection error.

In a possible implementation, the determining a reprojection error based on the target three-dimensional space point comprises:

determining a position obtained by projecting the target three-dimensional space point; and determining the reprojection error based on the position obtained by the projection.

In a possible implementation, the performing back-end optimization to the simultaneous localization and mapping system based on the relative reprojection error comprises:

deciding whether the relative reprojection error reaches a predetermined error threshold or not; and if the relative reprojection error does not reach the predetermined error threshold, reperforming the act of determining the target three-dimensional space point in the three-dimensional space points of the plurality of key frames located by the simultaneous localization and mapping system, so as to cause the relative reprojection error to reach the predetermined error threshold, and performing the back-end optimization to the simultaneous localization and mapping system based on the relative reprojection error.

In a possible implementation, before the determining a target three-dimensional space point in three-dimensional space points of a plurality of key frames located by a simultaneous localization and mapping system, further comprising:

initializing the simultaneous localization and mapping system.

In a possible implementation, the initializing the simultaneous localization and mapping system comprises:

obtaining a predetermined number of continuous frame images, and performing the preprocessing to the predetermined number of continuous frame images;

screening, with a pre-built adaptive-size sliding window, initial key frames in the predetermined number of continuous frame images with the influence of rotation removed, the initial key frame comprising the plurality of key frames; and performing simultaneous localization and mapping initialization based on the plurality of key frames.

In a possible implementation, the performing simultaneous localization and mapping initialization based on the plurality of key frame comprises:

determining relative poses of a first key frame and a last key frame in the plurality of key frames;

obtaining three-dimensional space points of respective key frames in the plurality of key frames based on the relative poses of the first key frame and the last key frame;

determining relative poses of respective key frames in the plurality of key frames based on the relative poses of the first key frame and the last key frame, and the three-dimensional space points of respective key frames in the plurality of key frames; and establishing an initial map based on the three-dimensional space points of respective key frames in the plurality of key frames and the relative poses of respective key frames in the plurality of key frames.

In a second aspect, embodiments of the present application provides an apparatus for back-end optimization of simultaneous localization and mapping, comprising:

a space point determining module, configured to determine a target three-dimensional space point in three-dimensional space points of a plurality of key frames located by a simultaneous localization and mapping system;

a reprojection error determining module, configured to determine a reprojection error based on the target three-dimensional space point;

a relative reprojection error determining module, configured to determine a relative reprojection error based on the reprojection error and a maximum parallax corresponding to the target three-dimensional space point after preprocessing, the preprocessing comprising an operation of removing influence of rotation; and a back-end optimization module, configured to perform back-end optimization to the simultaneous localization and mapping system based on the relative reprojection error.

In a possible implementation, further comprising: an error determining module, configured to, before the relative reprojection error determining module determines a relative reprojection error based on the reprojection error and a maximum parallax corresponding to the target three-dimensional space point after preprocessing, determine a plurality of target key frames corresponding to the target three-dimensional space point;

determine a plurality of parallaxes corresponding to the target three-dimensional space point after the preprocessing based on key point coordinates of a key frame ui, key point coordinates of a key frame uj, an intrinsic matrix of an image obtaining apparatus in the simultaneous localization and mapping system, and a rotation matrix of the key frame uj to the key frame ui, wherein the key frames ui and uj are any two of the plurality of target key frames, i=1, 2, . . . m, j=1, 2, . . . m, and m is equal to the number of the plurality of target keyframes; and determine the maximum parallax from the plurality of parallaxes corresponding to the target three-dimensional space point after the preprocessing.

In a possible implementation, the error determining module is specifically configured to:

calculate a product of the intrinsic matrix, the rotation matrix, an inverse matrix of the intrinsic matrix, and the key point coordinates of the key frame uj; and determine the plurality of parallaxes corresponding to the target three-dimensional space point after the preprocessing based on a difference between the key point coordinates of the key frame ui and the product.

In a possible implementation, the relative reprojection error determining module is specifically configured to:

calculate a ratio of the reprojection error to the maximum parallax; and determine the ratio as the relative reprojection error.

In a possible implementation, the reprojection error determining module is specifically configured to:

determine a position obtained by projecting the target three-dimensional space point; and determine the reprojection error based on the position obtained by the projection.

In a possible implementation, the back-end optimization module is specifically configured to:

decide whether the relative reprojection error reaches a predetermined error threshold or not; and if the relative reprojection error does not reach the predetermined error threshold, the space point determining module reperforms the act of determining the target three-dimensional space point in the three-dimensional space points of the plurality of key frames located by the simultaneous localization and mapping system, so as to cause the relative reprojection error to reach the predetermined error threshold, and the back-end optimization module performs the back-end optimization to the simultaneous localization and mapping system based on the relative reprojection error.

In a possible implementation, further comprising a simultaneous localization and mapping initializing module, configured to initialize the simultaneous localization and mapping system before the space point determining module determines a target three-dimensional space point in three-dimensional space points of a plurality of key frames located by a simultaneous localization and mapping system.

In a possible implementation, the simultaneous localization and mapping initializing module is specifically configured to:

obtain a predetermined number of continuous frame images, and performing the preprocessing to the predetermined number of continuous frame images;

screen, with a pre-built adaptive-size sliding window, initial key frames in the predetermined number of continuous frame images with the influence of rotation removed, the initial key frame comprising the plurality of key frames; and perform simultaneous localization and mapping initialization based on the plurality of key frames.

In a possible implementation, the simultaneous localization and mapping initializing module is specifically configured to:

determine relative poses of a first key frame and a last key frame in the plurality of key frames;

obtain three-dimensional space points of respective key frames in the plurality of key frames based on the relative poses of the first key frame and the last key frame;

determine relative poses of respective key frames in the plurality of key frames based on the relative poses of the first key frame and the last key frame, and the three-dimensional space points of respective key frames in the plurality of key frames; and establish an initial map based on the three-dimensional space points of respective key frames in the plurality of key frames and the relative poses of respective key frames in the plurality of key frames.

In a third aspect, embodiments of the present application provide a device for back-end optimization of simultaneous localization and mapping, comprising:

a processor;

a memory; and a computer program;

wherein the computer program is stored in the memory and is configured to be executed by the processor, the computer program comprising instructions for performing the method of the first aspect.

In a fourth aspect, embodiments of the present application provide a computer-readable storage medium, wherein the computer-readable storage medium stores a computer program, which causes a server to perform the method of the first aspect.

In a fifth aspect, embodiments of the present application provide a computer program product, comprising computer instructions which, when executed by a processor, perform the method of the first aspect.

In a sixth aspect, embodiments of the present application provide a computer program, wherein the computer program causes a server to perform the method of the first aspect.

Embodiments of the present application provide a method, apparatus and storage medium for back-end optimization of simultaneous localization and mapping, in the method, a target three-dimensional space point is determined in three-dimensional space points of a plurality of key frames located by a simultaneous localization and mapping system. In addition, a reprojection error is determined based on the target three-dimensional space point and a relative reprojection error is determined based on the reprojection error and a maximum parallax corresponding to the target three-dimensional space point after preprocessing, the preprocessing includes the operation of removing influence of rotation, so as to perform back-end optimization to the simultaneous localization and mapping system based on the relative reprojection error. The parallax is the baseline length between projection points of the three-dimensional space point on the camera frame. Embodiments of the present application provide the weight of the reprojection error by the parallax and obtains the relative reprojection error. The relative reprojection error describes the difference between the spatial position of the point and the spatial position of the camera. Thus, it can provide a more robust residual-error construction for the optimization of simultaneous localization and mapping, better perform spatial localization, and solve the problem of a low accuracy rate of the pose estimation after optimization because the existing back-end optimization fails to well represent the relationship between the reprojection error and the depth of the point and lacks the description of spatial information.

BRIEF DESCRIPTION OF THE DRAWINGS

In order to more clearly describe the technical solution in the embodiments of the present disclosure or the prior art, a brief introduction is presented below to the drawings to be used in the description of the embodiments or the prior art. It is obvious that the drawings in the following description are merely some of the embodiments of the present disclosure, and those of ordinary skill in the art may further obtain other drawings according to these drawings without the exercise of any inventive skill.

FIG. 3 is a schematic diagram of a reprojection error provided by an embodiment of the present application;

FIG. 4 is a schematic flowchart of another method of back-end optimization of simultaneous localization and mapping provided by an embodiment of the present application;

DETAILED DESCRIPTION

Figure 1:
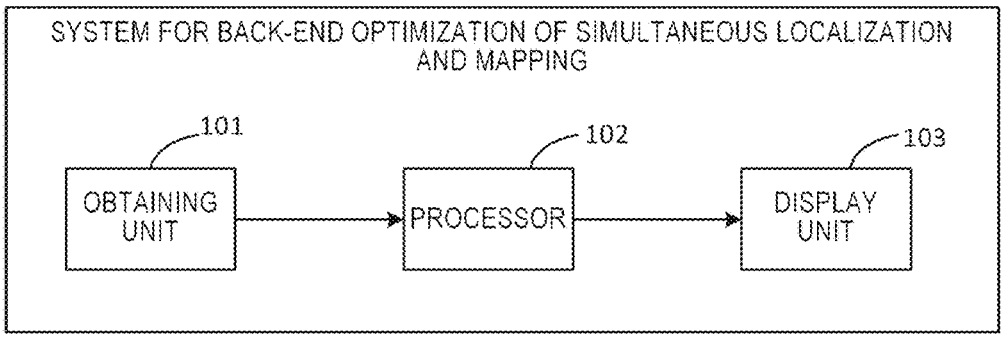
FIG. 1 is an architecture schematic diagram of a system for back-end optimization of simultaneous localization and mapping provided by an embodiment of the present application.

The technical solutions in the embodiments of the present application will be clearly and completely described below with reference to the drawings in the embodiments of the present application. Obviously, the described embodiments are only part of the embodiments of the present application, but not all of them. Based on the embodiments in the present application, all other embodiments obtained by those of ordinary skill in this field without creative labor belong to the scope of protection of the present application.

Terms such as "first", "second", "third" and "fourth" etc. (if any) in the specification and claims and the above drawings of the present application, are used to distinguish similar objects, and are not necessarily used to describe a specific order or sequence. It should be understood that the data used in this way can be interchanged under appropriate circumstances, so that the embodiments of the present application described herein can be implemented in a sequence other than those illustrated or described herein. In addition, the terms "include" and "have" and any variations thereof are intended to cover non-exclusive inclusion. For example, a process, method, system, product or device that includes a series of steps or units is not necessarily limited to those steps or units that are clearly listed, but may include other steps or units that are not clearly listed or inherent to the process, method, product or device.

In the related art, by taking the simultaneous localization and mapping algorithm in a mobile device as an example, the simultaneous localization and mapping algorithm is used to obtain the pose of the mobile device, an environment where the mobile device is located, and a position of the mobile device in the environment. When a user uses the mobile device, the front end of the simultaneous localization and mapping algorithm calculates the relative relationship between frames, such as calculating the relative pose between frames, while the back end is mainly used to optimize output results of the front end and obtain the optimal pose estimation. In the back-end optimization of simultaneous localization and mapping, the reprojection error between frame and frame matching key points is usually used as a loss function, and then overall optimization is performed based on the loss function. For example, when the loss function is small, the optimized pose estimation is obtained. The accuracy rate of pose estimation affects the effect of mobile devices in implementing augmented reality, virtual reality, automatic driving and other applications based on the simultaneous localization and mapping algorithm.

The reprojection error is the error obtained by comparing the pixel coordinates (the observed projection position) with the position obtained by projecting a three-dimensional point projected based on the current estimated pose. As an example, in the case of the same camera motion, the more distant a point, the smaller motion distance on the image, and the closer a point, the larger motion distance on the image. If the reprojection error is used as the loss function for the back-end optimization of simultaneous localization and mapping, when the loss function is small, the relationship between the reprojection error and the depth of the point cannot be well represented, and the description of spatial information is lacking. Therefore, it is not certain whether the optimization results are good at this time, which might lead to a low accuracy rate of pose estimation after optimization.

Therefore, the embodiments of the present application propose a method of back-end optimization of simultaneous localization and mapping. A relative reprojection error is obtained by providing weights to the reprojection error through parallax, wherein the parallax is the baseline length between projection points of a three-dimensional space point on the camera frame, so that the above relative reprojection error can describe the difference between the spatial position of the point and the spatial position of the camera. Thus, it can provide a more robust residual-error construction for the optimization of simultaneous localization and mapping, better perform spatial localization, and solve the problem of a low accuracy rate of the pose estimation after optimization because the existing back-end optimization fails to well represent the relationship between the reprojection error and the depth of the point and lacks the description of spatial information.

Alternatively, the method of back-end optimization of simultaneous localization and mapping provided by the embodiments of the present application may be applied to an application scenario as shown in FIG. 1. This figure merely describes, by way of example, a possible application scenario of the method of back-end optimization of simultaneous localization and mapping provided by the embodiments of this application, and the application scenario of the method disclosed herein is not limited to the application scenario shown in FIG. 1.

FIG. 1 is an architecture schematic diagram of a system for back-end optimization of simultaneous localization and mapping. In FIG. 1, the user processing a video on a mobile terminal device is taken as an example, wherein the mobile terminal device may be a mobile phone or a tablet, etc. The architecture may include an obtaining unit 101, a processor 102, and a display unit 103.

It may be understood that the structure illustrated in the embodiments of this application does not constitute any specific restrictions on the architecture of back-end optimization of simultaneous localization and mapping. In other feasible implementations of this application, the architecture may comprise more or fewer components than shown, or combine some components, or split some components, or have different component arrangements, which may be determined according to an actual application scenario, without limitation herein. The components shown in FIG. 1 may be implemented in hardware, software, or a combination of software and hardware.

Taking a mobile phone as an example of the above mobile terminal device, the obtaining unit 101 may be a camera on the mobile phone. The user can capture a video through the camera on the mobile phone, and then send the captured video to the processor 102 for processing. Here, in addition to the camera, the obtaining unit 101 may also be an input/output interface or a communication interface. The user may receive video and other information sent by other users through the interface and send the received video to the processor 102 for processing.

In the specific implementation process, after obtaining the video, the processor 102 may locate three-dimensional space points of a plurality of key frames in the video with a simultaneous localization and mapping system. Taking a certain target three-dimensional space point as an example, it may be any one of the three-dimensional space points. The processor 102 may determine a key value that can observe the target three-dimensional space point based on the three-dimensional space points of the plurality of key frames located by the simultaneous localization and mapping system, wherein the observed value is the projection of the target three-dimensional space point. Based on the determined target three-dimensional space point, the reprojection error is determined, and a weight is provided for the reprojection error by preprocessing the maximum parallax corresponding to the target three-dimensional space point, to obtain the relative reprojection error, wherein the preprocessing comprises the operation of removing influence of rotation. The parallax is the baseline length between projection points of the three-dimensional space point on the camera frame. Therefore, the relative reprojection error describes the difference between the spatial position of the point and the spatial position of the camera, thus providing a more robust residual construction for the optimization of simultaneous localization and mapping, enabling better spatial location and improving the accuracy rate of the pose estimation after optimization.

The display unit 103 may be configured to display the target three-dimensional space point, the reprojection error, the parallax and the relative reprojection error. The display unit may further be a touch display screen, which is configured to receive user instructions while displaying the above content to achieve interaction with the user.

It should be understood that the system architecture and business scenarios described in the embodiments of the present application are provided only for the purpose of more clearly illustrating the technical solution of the embodiments herein, and do not constitute a limitation on the technical solution provided by the embodiments. Those of ordinary skill in the art know that with the evolution of network architecture and the emergence of new business scenarios, the technical solution provided in the embodiments of this application are equally applicable to similar technical problems.

Several embodiments are taken as examples below to describe the technical solution of this application. The same or similar concepts or processes may not be repeated in some embodiments.

Figure 2:
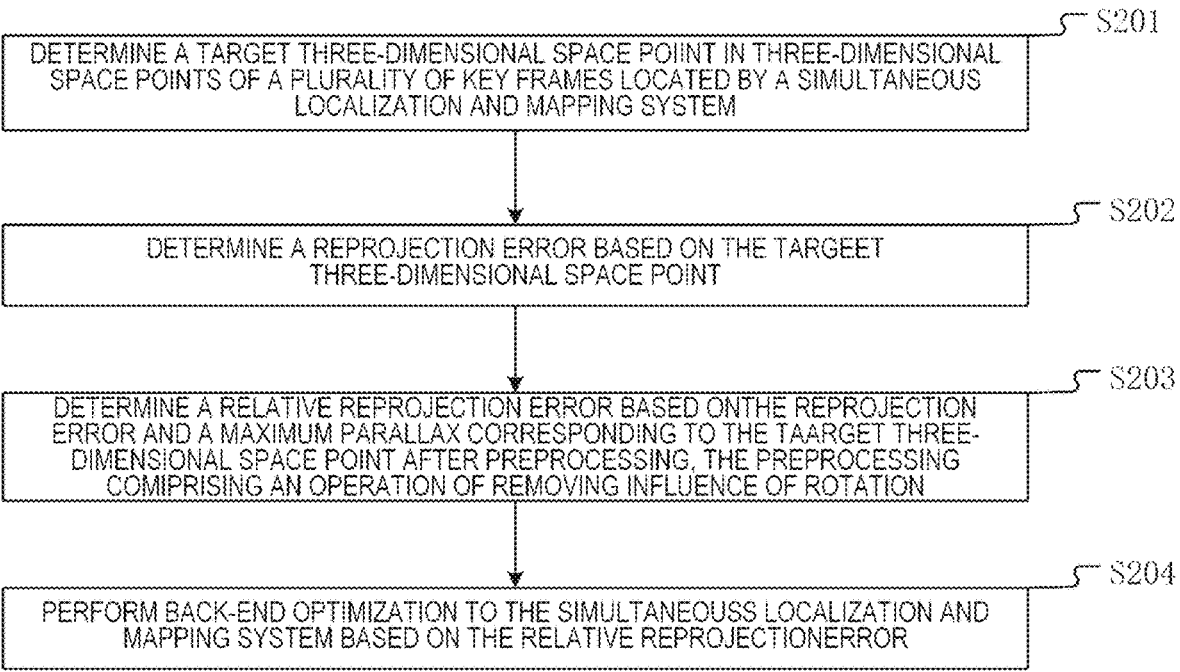
FIG. 2 is a schematic flowchart of a method of back-end optimization of simultaneous localization and mapping provided by an embodiment of the present application.

FIG. 2 is a schematic flowchart of a method of back-end optimization of simultaneous localization and mapping provided by an embodiment of the present application. The execution body of the present embodiment may be the processor 102 in FIG. 1. The specific execution body may be determined based on the actual application scenario, and the embodiments of the present application do not intend to make special restrictions. As shown in FIG. 2, the method of back-end optimization of simultaneous localization synchronous and mapping provided by an embodiment of the present application may comprises the following steps:

S201: determine a target three-dimensional space point in three-dimensional space points of a plurality of key frames located by a simultaneous localization and mapping system.

Here, the processor may first determine any of the three-dimensional space points of a plurality of key frames located by a simultaneous localization mapping system as the target three-dimensional space point, then determine a key value that can observe the target three-dimensional space point, the observed value being the projection of the target three-dimensional space point, and further determine a plurality of target key frames corresponding to the target three-dimensional space point.

S202: determine a reprojection error based on the target three-dimensional space point.

As an example, the processor may utilize the perspective N-point method to determine a position obtained by projecting the target three-dimensional spatial point, and then determine the reprojection error based on the position obtained by the projection.

The perspective N-point method is used to estimate the camera pose when only part of three-dimensional space points under the world coordinate system and their two-dimensional camera coordinate system are known. In the embodiments of the present application, the processor uses the perspective N-point method to determine a position obtained by projecting the target three-dimensional space point, and then determines the reprojection error based on the position.

Here, the reprojection error is the error obtained by comparing the pixel coordinates (the observed projection position) with the position (for example, the position obtained by projecting the target three-dimensional space point) obtained by projecting the three-dimensional point according to the current estimated pose.

The reprojection error is the reprojection error after removing the influence of rotation.

The calculation of the reprojection error is as shown in FIG. 3, wherein the observed values $p_1$ and $p_2$ are the projection of the same space point p, the projection $\hat{p}_2$ of p has a certain distance to the observed value $p_2$ i.e., the reprojection error.

Considering n three-dimensional space points P and their projections p, R and T are calculated, which may be expressed as $\xi$. Suppose a given space point $p_i=[X_i,Y_i,Z_i]^T$, the pixel coordinates of its projection are $u_i=[u_i,v_i]^T$ The relationship between the pixel position and the space point position is as follows:

$$s_i\begin{bmatrix}u_i\\v_i\\1\end{bmatrix} = \underbrace{k \ \exp\left(\xi^\wedge\right)}_{R,T}\begin{bmatrix}X_i\\Y_i\\Z_i\\1\end{bmatrix}$$

Wherein, $S_i$ is the distance (depth), k is the camera intrinsic matrix, R is the rotation matrix, and T is the translation matrix.

Accordingly, the matrix form is: $s_i u_i = k \ \exp(\xi^\wedge)p_i$.

There is an error in this equation due to the unknown camera pose and the noise of the observation point. Here, a sum of errors may be calculated to construct the least squares problem, and then the optimal camera pose is sought to minimize it:

$$\xi^* = \arg\min \frac{1}{2}\sum_{i=1}^{n}\left\|u_i - \frac{1}{s_i}k \ \exp\left(\xi^\wedge\right)p_i\right\|_2^2$$

It can be solved using the Gauss-Newton method/Levenberg-Marquardt method.

S203: determine a relative reprojection error based on the reprojection error and a maximum parallax corresponding to the target three-dimensional space point after preprocessing, the preprocessing comprising an operation of removing influence of rotation.

Here, the reasons for the preprocessing are: rotation affects the pixel distance difference of frames and the parallax between frames, so that the back-end optimization of simultaneous localization and mapping cannot obtain the optimal pose estimation. Therefore, in order to solve this problem, the embodiments of this application perform the above preprocessing, determine the relative reprojection error with the reprojection error and the preprocessed maximum parallax corresponding to the target three-dimensional space point, and perform the back-end optimization to the simultaneous localization and mapping system, to obtain the optimal pose estimation.

The processor may obtain the rotation information from an inertial measurement unit, so as to determine the pixel distance difference of frames affected by rotation based on the obtained information, determine the maximum parallax corresponding to the target three-dimensional space point after removing the influence of rotation, further determine the relative reprojection error, and perform the back-end optimization to the simultaneous localization and mapping system.

As an example, the processor may calculate a ratio of the reprojection error to the maximum parallax, and determine the ratio as the relative reprojection error. The parallax is the baseline length between projection points of the three-dimensional space point on the camera frame, so that the relative reprojection error can describe the difference between the spatial position of the point and the spatial position of the camera, a more robust residual construction may be provided for the optimization of simultaneous localization and mapping, better space location may be realized.

S204: perform back-end optimization to the simultaneous localization and mapping system based on the relative reprojection error.

In the embodiments of the present application, after determining the relative reprojection error, the processor may construct an optimization problem which takes the reprojection error as a loss function, and then perform back-end optimization to the simultaneous localization and mapping system based on the optimization problem, to obtain the optimized pose estimation. For example, the processor may decide whether the relative reprojection error reaches a predetermined error threshold (the predetermined error threshold may be determined based on the actual situation, e.g., equal to the minimum value of the relative reprojection error). If the relative reprojection error does not reach the predetermined error threshold, the processor may reperform the act of determining the target three-dimensional space point in three-dimensional space points of a plurality of key frames located by the simultaneous localization and mapping system, so as to cause the relative reprojection error to reach the predetermined error threshold, and then perform the back-end optimization to the simultaneous localization and mapping system based on the relative reprojection error.

In addition, when performing the back-end optimization to the simultaneous localization and mapping system, the processor takes into account the relative reprojection error, for example, constructs an optimization problem based on the relative reprojection error and performs the back-end optimization to the simultaneous localization and mapping system based on the optimization problem. The processor may further consider the above reprojection error, that is, it may construct an optimization problem based on the reprojection error and relative error at the same time, perform the back-end optimization to the simultaneous localization and mapping system based on the optimization problem, to obtain the optimal pose estimation and achieve more robust mapping.

In the embodiments of the present application, the processor determines the target three-dimensional space point in three-dimensional space points of the plurality of key frames located by the simultaneous and mapping system, then determines the reprojection error based on the target three-dimensional space point, and determines the relative reprojection error based on the reprojection error and the maximum parallax corresponding to the target three-dimensional space point after preprocessing which comprises the operation of removing the influence of rotation, so as to perform the back-end optimization to the simultaneous localization and mapping system according to the relative reprojection error. The parallax is the baseline length between projection points of three-dimensional space points on the camera frame. According to the embodiments of the present application, the weight is provided for the reprojection error through the parallax to obtain the relative reprojection error which describes the difference between the spatial position of the point and the spatial position of the camera. Thus, it can provide a more robust residual construction for the optimization problem of simultaneous localization and mapping, better perform spatial location, and solve the problem of a low accuracy rate of pose estimation after optimization because the existing back-end optimization cannot well represent the relationship between the reprojection error and the depth of the point and lacks a description of spatial information.

In addition, before determining the relative reprojection error based on the reprojection error and the maximum parallax corresponding to the target three-dimensional space point after preprocessing, the embodiments of the present application further take the following into consideration: determining a plurality of parallaxes corresponding to the target three-dimensional space point after the preprocessing so as to determine the maximum parallax from the plurality of parallaxes, determining the relative reprojection error based on the reprojection error and the maximum parallax, and performing the back-end optimization to the simultaneous localization and mapping system and based on the relative reprojection error, so as to obtain the optimal pose estimation. FIG. 4 is a schematic flowchart of another method of simultaneous localization and mapping proposed by an embodiment of the present application. As shown in FIG. 4, the method comprises:

S401: determine a target three-dimensional space point in three-dimensional space points of a plurality of key frames located by a simultaneous localization and mapping system.

S402: determine a reprojection error based on the target three-dimensional space point.

Steps S401-S402 are implemented in the same way as and the above steps S201-S202, which will not be described here.

S403: determine a plurality of target key frames corresponding to the target three-dimensional space point.

S404: determine a plurality of parallaxes corresponding to the target three-dimensional space point after the preprocessing based on key point coordinates of a key frame ui, key point coordinates of a key frame uj, an intrinsic matrix of an image obtaining apparatus in the simultaneous localization and mapping system, and a rotation matrix of the key frame uj to the key frame ui, wherein the key frames ui and uj are any two of the plurality of target key frames, i=1, 2, . . . m, j=1, 2, . . . m, and m is equal to the number of the plurality of target key frames.

S405: determine the maximum parallax from the plurality of parallaxes corresponding to the target three-dimensional space point after the preprocessing.

Here, the processor may first calculate the intrinsic matrix, the rotation matrix, an inverse matrix of the intrinsic matrix and a product of the key point coordinates of the key frame uj, then determine multiple parallaxes corresponding to the target three dimensional space point after the preprocessing according to a difference between the key point coordinates of the key frame ui and the product, and further determine the maximum parallax from the multiple parallaxes.

As an example, taking the key frame ui as a first frame and the key frame uj as a second frame, the parallax corresponding to the target three-dimensional space point after preprocessing as calculated by the processor comprises:

$$\text{parallax} = u_1 - k * R * k_{inv} * u_2$$

$u_i$ is the key point coordinates in the first frame of the multiple target key frames; $u_2$ is the key point coordinates in the second frame of the multiple target key frames; k is the intrinsic matrix of the image obtaining means in the simultaneous localization and mapping system, such as the intrinsic matrix of the camera; $k_{inv}$ is the inverse matrix of the intrinsic matrix; R is the rotation matrix for the second frame to the first frame.

As an example, the processor may calculate a ratio of the reprojection error to the maximum parallax, and thus, the ratio is used as the relative reprojection error.

S406: determine a relative reprojection error based on the reprojection error and the maximum parallax.

407: perform back-end optimization to the simultaneous localization and mapping system based on the relative reprojection error.

Steps S406-S407 are implemented in the same way as steps S203-S204, which will not be described here.

In the embodiments of the present application, before determining the relative reprojection error based on the reprojection error and the maximum parallax corresponding to the target three-dimensional space point after the preprocessing, the processor further takes the following into consideration: determining a plurality of parallaxes corresponding to the target three-dimensional space point after the preprocessing so as to determine the maximum parallax from the plurality of parallaxes, determining the relative reprojection error based on the reprojection error and the maximum parallax, and performing the back-end optimization to the simultaneous localization and mapping system and based on the relative reprojection error, so as to obtain the optimal pose estimation. Furthermore, by providing the weight for the reprojection error through the parallax, the processor obtains the relative reprojection error that describes the difference between the spatial position of the point and the spatial position of the camera, thereby providing a more robust residual construction for the optimization problem of simultaneous localization and mapping, better performing spatial location, and solving the problem of a low accuracy rate of pose estimation after optimization because the existing back-end optimization cannot well represent the relationship between the reprojection error and the depth of the point and lacks a description of spatial information.

Figure 5:
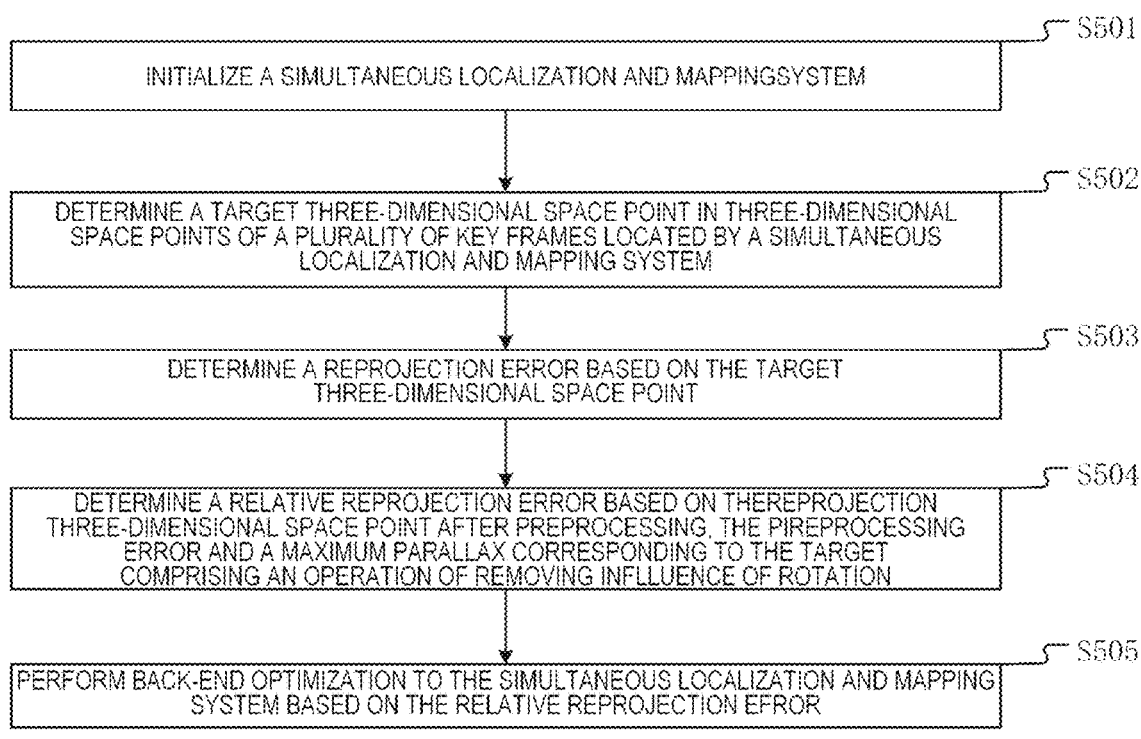
FIG. 5 is a schematic flowchart of yet another method of back-end optimization of simultaneous localization and mapping provided by an embodiment of the present application.

In addition, before determining the target three-dimensional space point in the three-dimensional space points of a plurality of key frames located by the simultaneous localization and mapping system, the embodiments of the present application further considers initializing the simultaneous localization and mapping system, so as to ensure the normal subsequent processing. FIG. 5 is a schematic flowchart of a still further method of back-end optimization of simultaneous localization and mapping proposed by an embodiment of the present application. As shown in FIG. 5, the method comprises:

S501: initialize a simultaneous localization and mapping system.

Here, the processor may first obtain a predetermined number of continuous frame images, then perform the above preprocessing to the predetermined number of continuous frame images, and screen, with a pre-built adaptive-size sliding window, initial key frames from the predetermined number of continuous frame images with the influence of rotation removed. The initial key frames comprise a plurality of key frames. Therefore, simultaneous localization and mapping is initialized based on the plurality of key frames.

As an example, the processor may determine the relative poses of the first key frame and the last key frame in the initial key frames, obtain three-dimensional space points of respective key frames in the plurality of key frames based on the relative poses of the first key frame and the last key frame, determine the relative poses of respective key frames in the plurality of key frames based on the relative poses of the first key frame and the last key frame, and the three-dimensional space points of respective key frames in the plurality of key frames, and finally establish an initial map based on the three-dimensional space points of respective key frames in the plurality of key frames and the relative poses of respective key frames in the plurality of key frames, thereby completing the initialization of a simultaneous localization and mapping system.

The predetermined number of continuous frame images may be determined according to the actual situation, such as frame 1, frame 2 . . . frame 25 in a video. The processor may pre-build an adaptive-size sliding window. The sliding window is adjustable in size, and the specific size thereof may be determined according to the actual situation, such as 5-frame image frame size to 10-frame image frame size. The processor uses the sliding window to screen the initial key frames in the predetermined number of continuous frame images that remove the influence of rotation. For example, if the length of the sliding window is 5 frames, the processor uses the sliding window to screen the predetermined number of continuous frame images with the influence of rotation removed, such as frames 1, 2 . . . 25 in the video, and frame 6, frame 7, frame 10, frame 12 and frame 13 are filtered out as the initial key frames.

The reason for the preprocessing is that rotation affects the pixel distance difference of frames, but the initialization of simultaneous localization and mapping cannot be performed with rotation alone. Therefore, in order to solve this problem, the embodiments of the present application perform the above preprocessing, and screen the initial key frames in the window with the pixel distance difference with the influence of rotation removed, thereby ensuring that there is enough pixel distance difference between the frames in the window for the initialization of simultaneous localization and mapping with enough common view between them.

The processor performs the initialization of simultaneous localization and mapping based on the initial key frames filtered out from a certain number of continuous frame images, thereby reducing the initialization time of simultaneous localization and mapping. Moreover, by screening the initial key frames in the window with the pixel distance difference from which the rotation effect has been removed, the processor ensures that there is an enough pixel distance difference between frames in the window for simultaneous localization and mapping initialization and at the same time the rotation effect on simultaneous localization and mapping initialization is reduced, thus improving the accuracy of simultaneous localization and mapping initialization.

In addition, because the rotation is known and the scale is not objective, the processor may use only two frames for simultaneous localization and mapping initialization after filtering out the initial key frames. In the embodiments of the present application, in order to ensure a sufficient pixel distance difference between frames in the window on the premise of sufficient common view, the processor may use the first and last key frame in the initial key frames for simultaneous localization and mapping initialization.

As an example, the processor may first extract two-dimensional key points of the first and last key frames to obtain a two-dimensional key point of the first key frame and a two-dimensional key point of the last key frame, so as to determine the relative pose of the first key frame and the last key frame with the two-dimensional key points of the first key frame and the two-dimensional key point of the last key frame.

Further, the processor may determine an essential matrix corresponding to the first key frame and the last key frame with the two-dimensional key point of the first key frame and the two-dimensional key point of the last key frame, then obtain the rotation matrix R and the translation matrix T based on the essential matrix, and thus determine the relative pose between the first and last key frame according to the rotation matrix R and the translation matrix T.

As an example, the processor may first determine an essential matrix corresponding to the first key frame and the last key frame, obtain the rotation matrix R and the translation matrix T according to the essential matrix, and thus determine the relative poses of the first key frame and the last key frame based on the rotation matrix R and the translation matrix T. The processor may use a random consistency sampling method to determine the essential matrix corresponding to the first and last key frames, and then solve the rotation matrix R and translation matrix T from the essential matrix by singular value decomposition. Here, the rotation matrix R and translation matrix T are the pose parameters of the camera, and the rotation matrix R is known. Thus, the processor determines the relative poses of the first and last key frames based on the rotation matrix R and the translation matrix T.

In the embodiments of the present application, the processor may obtain the three-dimensional space points of respective key frames in the initial key frames based on triangulation calculation.

As an example, the processor may carry out triangulation calculation based on the relative poses of the first and last key frame to obtain the three-dimensional space points of the first and last key frame. Then, based on the three-dimensional space points of the first and last key frame as well as a feature matching relationship between frames in the initial key frames, the processor may determine the three-dimensional space points of remaining respective key frames in the initial key frames except the first and last key frame, thus obtaining the three-dimensional space points of respective key frames in the initial key frames.

Here, the processor performing the triangulation calculation may comprise the following steps:

For example, regarding the homogeneous coordinates $[x,y,z,1]^T$ of the three-dimensional space point, the projection of the three-dimensional space point on the image is $$\lambda \begin{bmatrix} u \\ v \\ 1 \end{bmatrix} = \underbrace{k\langle R|T \rangle}_{P} \begin{bmatrix} x \\ y \\ z \\ 1 \end{bmatrix}$$

Where, is the camera intrinsic matrix, R is the rotation matrix, and T is the translation matrix. Here, $k\langle R|T \rangle$ is denoted by parameter P, $$\begin{bmatrix} u \\ v \\ 1 \end{bmatrix}$$

is denoted by X, $$\begin{bmatrix} x \\ y \\ z \\ 1 \end{bmatrix}$$

is denoted by X. Thus, $\lambda u = PX$ is obtained.

By multiplying both sides by u at the same time, $u\char`\^PX=0$ is obtained.

Expand to obtain:

$$\begin{bmatrix} 0 & -1 & v \\ 1 & 0 & -u \\ -v & u & 0 \end{bmatrix} \begin{bmatrix} p_1 \\ p_2 \\ p_3 \end{bmatrix} x = 0$$

Further obtain:

$$\begin{cases} (vp_3 - p_2)x = 0 \\ (p_1 - up_3)x = 0 \\ (up_2 - vp_1)x = 0 \end{cases}$$

Two of the above three equations are linearly independent because equation (1)×(−u)−equation (2)×v=equation (3), where Pi is the row of the matrix P. One frame may form two equations, so two frames may form four equations:

$$\underbrace{\begin{bmatrix} v_1 P_3^1 - P_2^1 \\ P_1^1 - u_1 P_3^1 \\ v_2 P_3^2 - P_2^2 \\ P_1^2 - u_2 P_3^2 \end{bmatrix}}_{H} X = 0$$

Here, singular value decomposition may be used, and the homogeneous coordinates X are the singular vector of the least singular values of H.

In addition, after obtaining the relative poses of the first key frame and last key frame, and the three-dimensional space points of respective key frames in the initial key frames, the processor may further determine a position of projecting the three-dimensional space points of respective key frames in the plurality of key frames in the first and last key frames, then determine a reprojection error based on the position obtained by the projection, and further determine the relative poses of respective key frames in the plurality of key frames based on the reprojection error and the three-dimensional space point of each key frame in the multiple key frames.

After determining the reprojection error, the processor may further determine the relative reprojection error, thus determining the relative poses of respective key frames in the plurality of key frames based on the reprojection error and the three-dimensional space points of respective key frames in the plurality of key frames and improving the accuracy rate of pose estimation.

As an example, when determining the relative poses of respective key frames in the plurality of key frames based on the reprojection error and/or the relative reprojection error, the processor may construct a local optimization problem which takes the reprojection error and/or the relative reprojection error as a loss function. When a value of the loss function reaches a predetermined error threshold, the relative poses of respective key frame in the initial key frames may be obtained, and the precision of simultaneous localization and mapping initialization may be improved.

Here, before establishing the initial map based on the three-dimensional space points of respective key frames in the plurality of key frames and the relative poses of respective key frame in the plurality of key frames, the processor may determine another reprojection error based on the three-dimensional space points of respective key frames in the plurality of key frames, then perform global optimization based on the reprojection error to obtain the three-dimensional space points of respective key frames in the plurality of key frames after optimization and the relative poses of respective key frames in the plurality of key frames, and thus establish the initial map based on the three-dimensional space points of respective key frames in the initial key frames and the relative poses of respective key frames in the initial key frame after optimization.

After determining the reprojection error, the processor may further determine the relative reprojection error and thus perform global optimization based on the relative reprojection error to obtain the three-dimensional space points of respective key frames in the plurality of key frames and the relative poses of respective key frames in the plurality of key frames after optimization, so as to better perform spatial location.

As an example, after determining the reprojection error and the relative reprojection error, the processor may construct a global optimization problem which takes the reprojection error and/or the relative reprojection error as a loss function, then based on the optimization problem, obtain the three-dimensional space points of respective key frames in the initial key frames and the relative poses of respective key frame in the initial key frames after optimization, and thus establish an initial map based on the optimized information to precisely provide the map point information.

S502: determine a target three-dimensional space point in three-dimensional space points of a plurality of key frames located by a simultaneous localization and mapping system.

S503: determine a reprojection error based on the target three-dimensional space point.

S504: determine a relative reprojection error based on the reprojection error and a maximum parallax corresponding to the target three-dimensional space point after preprocessing, the preprocessing comprising an operation of removing influence of rotation.

S505: perform back-end optimization to the simultaneous localization and mapping system based on the relative reprojection error.

Steps S502-S505 are implemented in the same way as steps S201-S204 above, which will not be described here.

In the embodiments of the present application, the processor may further initialize the simultaneous localization and mapping system, so as to ensure the normal subsequent processing. Moreover, by providing the weight for the reprojection error through the parallax, the processor obtains the relative reprojection error that describes the difference between the spatial position of the point and the spatial position of the camera, thereby providing a more robust residual construction for the optimization problem of simultaneous localization and mapping, better performing spatial location, and solving the problem of a low accuracy rate of pose estimation after optimization because the existing back-end optimization cannot well represent the relationship between the reprojection error and the depth of the point and lacks a description of spatial information.

Figure 6:
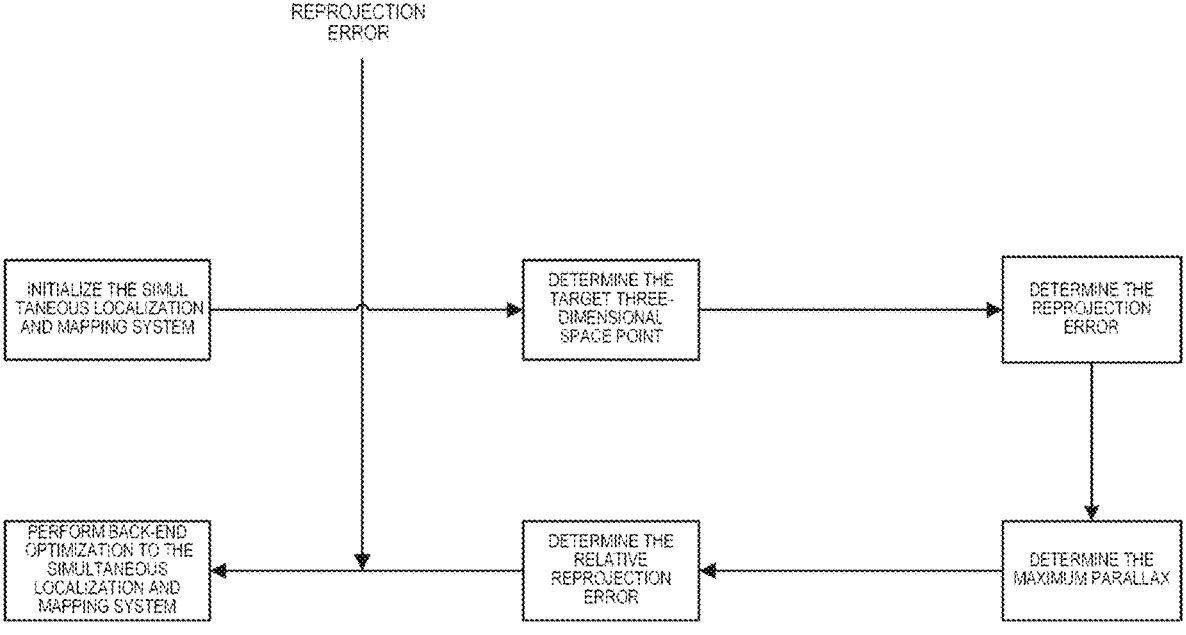
FIG. 6 is a schematic diagram of back-end optimization of simultaneous localization and mapping provided by an embodiment of the present application.

In the embodiments of the present application, as shown in FIG. 6, the processor may first initialize the simultaneous localization and mapping system, and then determine the target three-dimensional space point in the three-dimensional space points of a plurality of key frames located by the simultaneous localization and mapping system. Further, the processor may determine the reprojection error based on the target three-dimensional space point, and determine the relative reprojection error based on the reprojection error and the maximum parallax corresponding to the target three-dimensional space point after preprocessing, the preprocessing comprising an operation of removing the influence of rotation. The processor determines the maximum parallax after the removal of rotation, calculates a ratio of the reprojection error to the maximum parallax, takes the ratio as the relative reprojection error, and finally performs back-end optimization to the simultaneous localization and mapping system based on the relative reprojection error, the synchronous positioning and mapping system is optimized at the back end, or performs back-end optimization to the simultaneous localization and mapping system by taking into account the relative reprojection error and reprojection error at the same time.

Compared with the existing back-end optimization of simultaneous localization and mapping, the processor provides weights for the reprojection error through the parallax, and obtains the relative reprojection error that describes the difference between the spatial position of the point and the spatial position of the camera, thereby providing a more robust residual construction for the optimization problem of simultaneous localization and mapping, better performing spatial location, and solving the problem of a low accuracy rate of pose estimation after optimization because the existing back-end optimization cannot well represent the relationship between the reprojection error and the depth of the point and lacks a description of spatial information.

Figure 7:
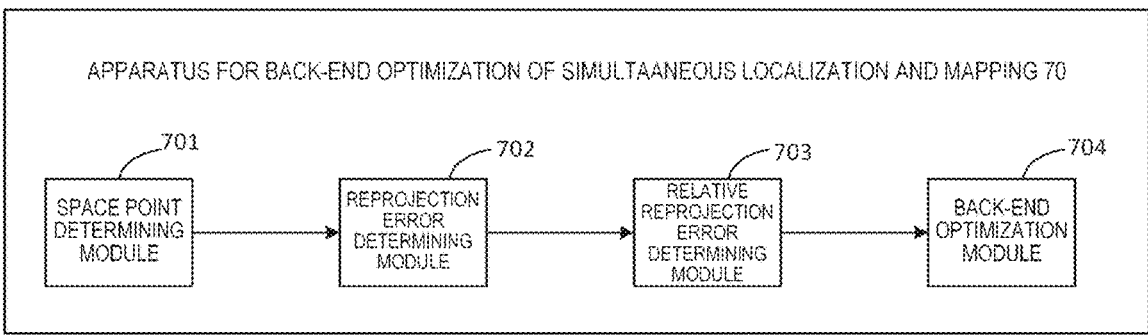
FIG. 7 is a structural schematic diagram of an apparatus for back-end optimization of simultaneous localization and mapping provided by an embodiment of the present application.

Corresponding to the method of back-end optimization of simultaneous localization and mapping in the above embodiments, FIG. 7 is a structural schematic diagram of an apparatus for back-end optimization of simultaneous localization and mapping provided by an embodiment of the present application. For the sake of illustration, only the parts relevant to the embodiments of the present application are shown. FIG. 7 is a structural schematic diagram of an apparatus for back-end position of simultaneous localization and mapping provided by an embodiment of the present application. The apparatus for back-end optimization of simultaneous localization and mapping 70 comprises: a space point determining module 701, a reprojection error determining module 702, a relative reprojection error determining module 703 and a back-end optimization module 704. Here the apparatus for back-end optimization of simultaneous localization and mapping may be the above processor itself, or a chip or integrated circuit that performs the functionality of a processor. It is noteworthy that the space point determining module, the reprojection error determining module, the relative reprojection error determining module and the back-end optimization module are divided in terms of logical functionality, two of which may be physically integrated or independent.

The space point determining module 701 is configured to determine a target three-dimensional space point in three-dimensional space points of a plurality of key frames located by a simultaneous localization and mapping system.

The reprojection error determining module 702 is configured to determine a reprojection error based on the target three-dimensional space point.

The relative reprojection error determining module 703 is configured to determine a relative reprojection error based on the reprojection error and a maximum parallax corresponding to the target three-dimensional space point after preprocessing, the preprocessing comprising an operation of removing influence of rotation.

The back-end optimization module 704 is configured to perform back-end optimization to the simultaneous localization and mapping system based on the relative reprojection error.

In a possible implementation, the relative reprojection error determining module 703 is specifically configured to:

calculate a ratio of the reprojection error to the maximum parallax; and determine the ratio as the relative reprojection error.

In a possible implementation, the reprojection error determining module 702 is specifically configured to:

determine a position obtained by projecting the target three-dimensional space point; and determine the reprojection error based on the position obtained by the projection.

In a possible implementation, the back-end optimization module 704 is specifically used to:

decide whether the relative reprojection error reaches a predetermined error threshold or not; and if the relative reprojection error does not reach the predetermined error threshold, the space point determining module 701 reperforms the act of determining the target three-dimensional space point in the three-dimensional space points of a plurality of key frames located by the simultaneous localization and mapping system, so as to cause the relative reprojection error to reach the predetermined error threshold, and the back-end optimization module 704 performs the back-end optimization to the simultaneous localization and mapping system based on the relative reprojection error.

The apparatus provided in the embodiments of the present application may be used to implement the technical solution of the method embodiments in FIG. 2, with similar implementation principle and technical effect, which will not be repeated here.

Figure 8:
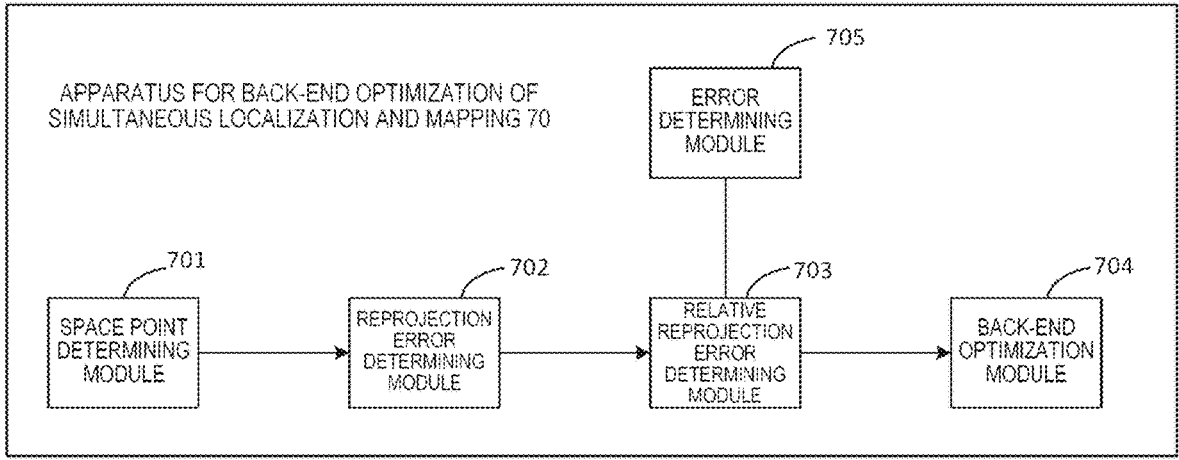
FIG. 8 is a structural schematic diagram of another apparatus for back-end optimization of simultaneous localization and mapping provided by an embodiment of the present application.

FIG. 8 is a structural schematic diagram of another apparatus for back-end optimization of simultaneous localization and mapping provided by an embodiment of the present application. Based on the embodiment shown in FIG. 7, the apparatus 70 for back-end optimization of simultaneous localization and mapping further comprises an error determining module 705.

The error determining module 705 is configured to before the relative reprojection error determining module 703 determines the relative reprojection error based on the reprojection error and the maximum parallax corresponding to the target three-dimensional space point after preprocessing, determine a plurality of target key frames corresponding to the target three-dimensional space point;

determine a plurality of parallaxes corresponding to the target three-dimensional space point after the preprocessing based on key point coordinates of a key frame ui, key point coordinates of a key frame uj, an intrinsic matrix of an image obtaining apparatus in the simultaneous localization and mapping system, and a rotation matrix of the key frame uj to the key frame ui, wherein the key frames ui and uj are any two of the plurality of target key frames, i=1, 2, . . . m, j=1, 2, . . . m, m equaling the number of the plurality of target keyframes; and determine the maximum parallax from the plurality of parallaxes corresponding to the target three-dimensional space point after the pre-processing.

In a possible implementation, the error determining module 705 is specifically configured to:

calculate a product of the intrinsic matrix, the rotation matrix, an inverse matrix of the intrinsic matrix, and the key point coordinates of the key frame uj;

determine the plurality of parallaxes corresponding to the target three-dimensional space point after the preprocessing based on a difference between the key point coordinates of the key frame ui and the product.

The apparatus provided in the embodiments of the present application may be used to implement the technical solution of the method embodiments in FIG. 4, with similar implementation principle and technical effect, which will not be repeated here.

Figure 9:
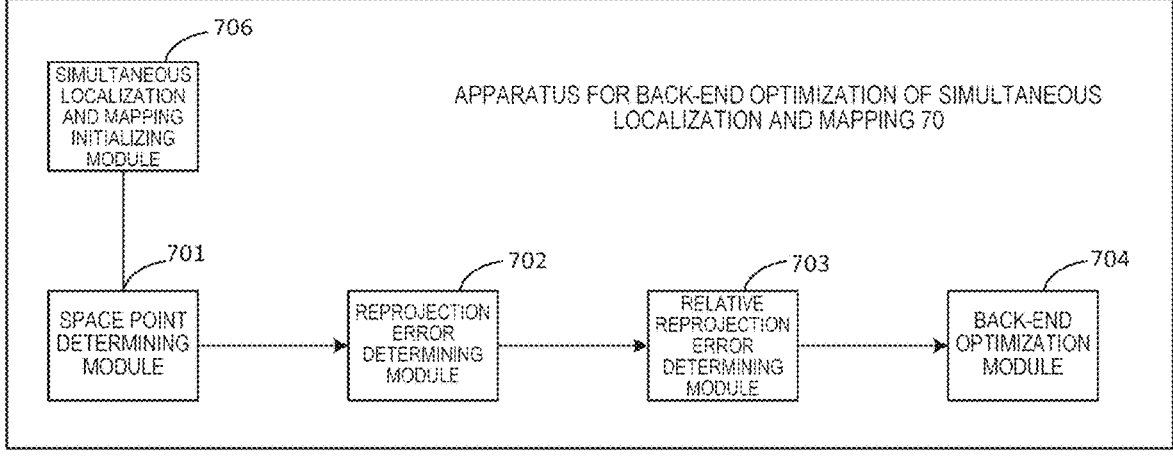
FIG. 9 is a structural schematic diagram of yet another apparatus for back-end optimization of simultaneous localization and mapping provided by an embodiment of the present application.

FIG. 9 is a structural schematic diagram of another apparatus for back-end optimization of simultaneous localization and mapping provided by an embodiment of the present application. Based on the embodiment shown in FIG. 7, the apparatus 70 for back-end optimization of simultaneous localization and mapping further comprises a simultaneous localization and mapping initializing module 706.

The simultaneous localization and mapping initializing module 706 is configured to initialize the simultaneous localization and mapping system before the space point determining module 701 determines the target three-dimensional space point in the three-dimensional space points of multiple key frames located by the simultaneous localization and mapping system.

In a possible implementation, the simultaneous localization and mapping initializing module 706 is specifically configured to:

obtain a predetermined number of continuous frame images, and perform the preprocessing to the predetermined number of continuous frame images;

screen, with a pre-built adaptive-size sliding window, initial key frames in the predetermined number of continuous frame images with the influence of rotation removed, the initial key frame comprising the plurality of key frames; and perform simultaneous localization and mapping initialization. Wherein an initial map is established based on three-dimensional space points of respective key frames in the initial key frames and the relative poses of respective key frames in the initial key frames.

In a possible implementation, the simultaneous localization and mapping initializing module 706 is specifically configured to:

determine relative poses of a first key frame and a last key frame in the plurality of key frames;

obtain three-dimensional space points of respective key frames in the plurality of key frames based on the relative poses of the first key frame and the last key frame;

determine relative poses of respective key frames in the plurality of key frames based on the relative poses of the first key frame and the last key frame, and the three-dimensional space points of respective key frames in the plurality of key frames;

determine the relative poses of respective key frames in the initial key frames based on the determined reprojection error.

In a possible implementation, the simultaneous localization and mapping initializing module 706 is specifically configured to:

determine a position obtained by projecting the three-dimensional space points of respective key frames in the plurality of key frames into the first key frame and the last key frame;

determine a reprojection error based on the position obtained by the projection;

determine the relative poses of respective key frames in the plurality of key frames based on the reprojection error and the three-dimensional space points of respective key frames in the plurality of key frames.

In a possible implementation, the simultaneous localization and mapping initializing module 706 is specifically configured to:

determine a further reprojection error based on the three-dimensional space points of respective key frames in the plurality of key frames;

perform a global optimization based on the reprojection error, to obtain the three-dimensional space points of respective key frames in the plurality of key frames and the relative poses of respective key frames in the plurality of key frames after optimization;

establish the initial map based on the three-dimensional space points of respective key frames in the plurality of key frames and the relative poses of respective key frames in the plurality of key frames after optimization.

The apparatus provided in the embodiments of the present application may be used to implement the technical solution of the method embodiments in FIG. 5, with similar implementation principle and technical effect, which will not be repeated here.

Figure 10A:
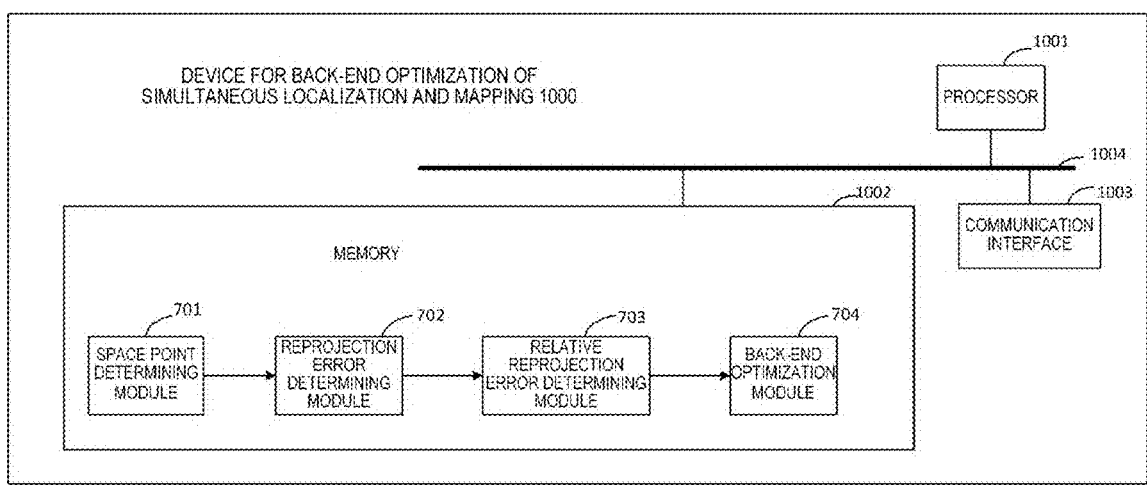
FIG. 10A is a basic hardware architecture schematic diagram of a device for back-end optimization of simultaneous localization and mapping provided by an embodiment of the present application.
Figure 10B:
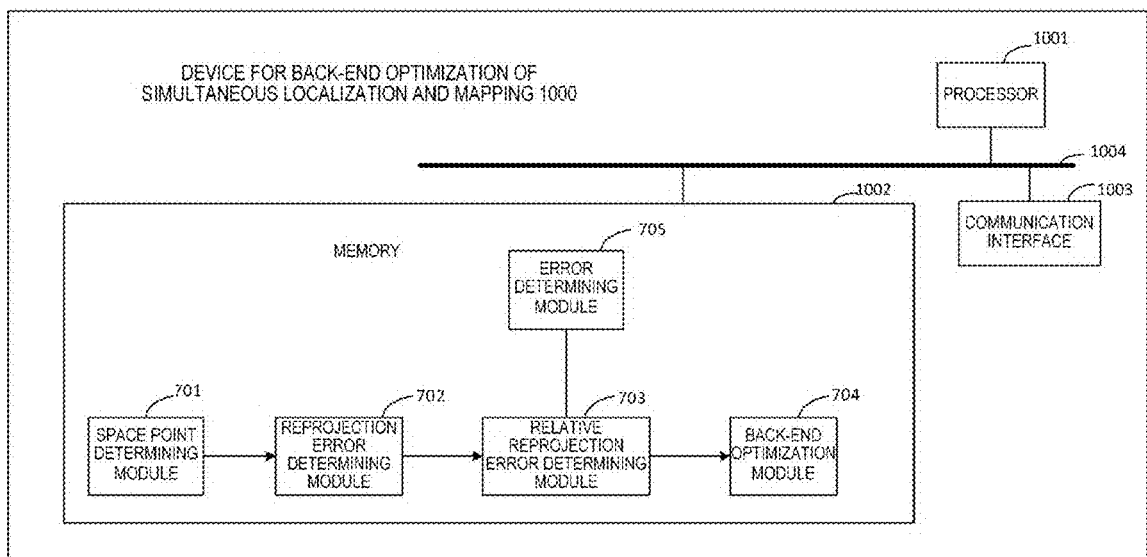
FIG. 10B is a basic hardware architecture schematic diagram of another device for back-end optimization of simultaneous localization and mapping provided by an embodiment of the present application.
Figure 10C:
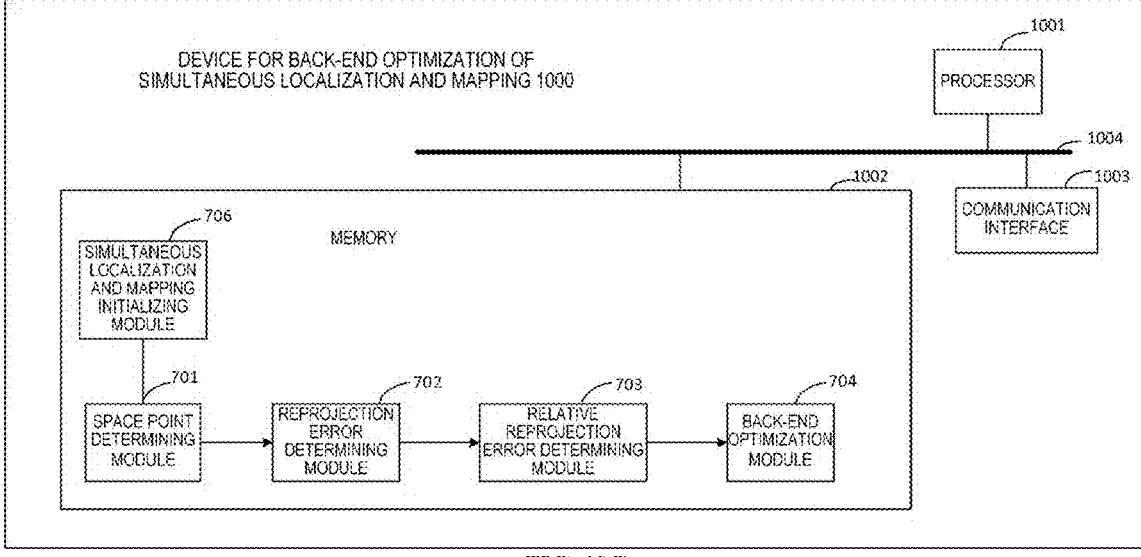
FIG. 10C is a basic hardware architecture schematic diagram of yet another device for back-end optimization of simultaneous localization and mapping provided by an embodiment of the present application.

Alternatively, as an example, FIGS. 10A, 10B, and 10C provide a possible basic hardware architecture schematic diagram of for back-end optimization of simultaneous localization and mapping provided by an embodiment of the present application.

Referring to FIGS. 10A, 10B, and 10C, a device for back-end optimization of simultaneous localization and mapping 1000 includes at least one processor 1001 and a communication interface 1003. Alternatively, a memory 1002 and a bus 1004 may be included.

The number of processors 1001 can be one or more in the device for back-end optimization of simultaneous localization and mapping 1000. FIGS. 10A, 10B, and 10C show only one processor 1001. Alternatively, the processor 1001 can be a Central Processing Unit (CPU), Graphics Processing Unit (GPU), or Digital Signal Processor (Digital Signal Processor). DSP. If the device for back-end optimization of simultaneous localization and mapping 1000 has a plurality of processors 1001, the type of the plurality of processors 1001 can be different, or can be the same. Alternatively, the plurality of processors 1001 of the device for back-end optimization of simultaneous localization and mapping 1000 can also be integrated as a multi-core processor.

The memory 1002 stores computer instructions and data. The memory 1002 may store computer instructions and data necessary to implement the method of back-end optimization of simultaneous localization and mapping provided in this application, for example, the memory 1002 stores instructions for implementing the steps of method of back-end optimization of simultaneous localization and mapping. The memory 1002 may be any or a combination of any of the following storage media: Non-volatile Memory (e.g. Read Only Memory (ROM), Solid State Drive (SSD), Hard Disk Drive (HDD), optical disc), volatile memory.

The communication interface 1003 may provide information input/output to at least one processor. It may also include any one or any combination of the following: a network interface (such as an Ethernet interface), a wireless network card, and other devices with network access functions.

Alternatively, the communication interface 1003 can also be used for the device for back-end optimization of simultaneous localization and mapping 1000 for data communication with other computing devices or terminals.

Alternatively, FIGS. 10A, 10B, and 10C represent a bus 1004 with a thick line. The bus 1004 can connect the processor 1001 to the memory 1002 and the communication interface 1003. In this way, through the bus 1004, the processor 1001 can access the memory 1002, and can also use the communication interface 1003 to interact with other computing devices or terminals.

In the present application, the device for back-end optimization of simultaneous localization and mapping 1000 executes the computer instructions in the memory 1002, so that the device for back-end optimization of simultaneous localization and mapping 1000 realizes the above method of back-end optimization of simultaneous localization and mapping provided in this application. Or enable the device for back-end optimization of simultaneous localization and mapping 1000 to deploy the apparatus for back-end optimization of simultaneous localization and mapping.

From the logical function division, as an example, as shown in FIG. 10A, the memory 1002 may include a space point determining module 701, a reprojection error determining module 702, a relative reprojection error determining module 703, and a back-end optimization module 704. The inclusion here refers only to functions of the space point determining module, the reprojection error determining module, the relative reprojection error determining module and the back-end optimization module when the instructions stored in the memory are executed, and is not limited to the physical structure.

As an example, as shown in FIG. 10B, the memory 1002 may further include an error determining module 705. The inclusion here refers only to the function of the error determining module when the instructions stored in the memory are executed, and is not limited to the physical structure.

As an example, as shown in FIG. 10C, the memory 1002 may further include a simultaneous localization and mapping initializing module 706. The inclusion here refers only to the functions of the simultaneous localization and mapping initializing module when the instructions stored in the memory are executed, and is not limited to the physical structure.

In addition, the device for back-end optimization of simultaneous localization and mapping can be realized by software, as shown in FIGS. 10A, 10B and 10C, but also as a hardware module, or as a circuit unit, through hardware.

The present application provides a computer-readable storage medium, the computer program product includes a computer instruction, the computer instruction instructs the computing equipment to perform the method of back-end optimization of simultaneous localization and mapping provided in the present application.

The present application provides a computer program product comprising a computer instruction that is executed by a processor to implement the method of the first aspect.

The present application provides a chip which includes at least one processor and a communication interface, where the communication interface provides information input and/or output for the at least one processor. Further, the chip may also include at least one memory for storing computer instructions. The at least one processor is used for calling and running the computer instructions to execute the information interaction method provided by the present application.

In several embodiments provided in the present application, it should be understood that the disclosed apparatus and method can be implemented in other ways. For example, the above-described apparatus embodiment is only schematic, for example, the division of the units is only a logical function division, and there may be other ways of division in actual implementations, for example, multiple units or components may be combined or integrated into another system, or some features may be ignored or not executed. On the other hand, the shown or discussed mutual coupling or direct coupling or communication connection may be indirect coupling or communication connection through some interfaces, apparatuses or units, which may be in electrical, mechanical or other forms.

The units described as separate components may or may not be physically separated, and the components displayed as units may or may not be physical units, that is, they may be located in one place or distributed over multiple network units. Some or all of the units can be selected according to the actual needs to achieve the purpose of the solutions in the embodiments.

In addition, each functional unit in each embodiment of the present application may be integrated into one processing unit, or each unit may exist physically alone, or two or more units may be integrated into one unit. The above integrated units can be realized in the form of hardware or hardware plus software functional units.

I claim:

1. A method of back-end optimization of simultaneous localization and mapping, comprising:
   determining a target three-dimensional space point in three-dimensional space points of a plurality of key frames located by a simultaneous localization and mapping system;
   determining a reprojection error based on the target three-dimensional space point;
   determining a relative reprojection error based on the reprojection error and a maximum parallax corresponding to the target three-dimensional space point after preprocessing, the preprocessing comprising an operation of removing influence of rotation; and
   performing back-end optimization to the simultaneous localization and mapping system based on the relative reprojection error.

2. The method according to claim 1, wherein before the determining a relative reprojection error based on the reprojection error and a maximum parallax corresponding to the target three-dimensional space point after preprocessing, the method further comprises:
   determining a plurality of target key frames corresponding to the target three-dimensional space point;
   determining a plurality of parallaxes corresponding to the target three-dimensional space point after the preprocessing based on key point coordinates of a key frame ui, key point coordinates of a key frame uj, an intrinsic matrix of an image obtaining apparatus in the simultaneous localization and mapping system, and a rotation matrix of the key frame uj to the key frame ui, wherein the key frames ui and uj are any two of the plurality of target key frames, i=1, 2, . . . m, j=1, 2, . . . m, and m is equal to the number of the plurality of target key frames; and
   determining the maximum parallax from the plurality of parallaxes corresponding to the target three-dimensional space point after the preprocessing.

3. The method according to claim 2, wherein determining the plurality of parallaxes corresponding to the target three-dimensional space point after the preprocessing based on key point coordinates of a key frame ui, key point coordinates of a key frame uj, an intrinsic matrix of an image obtaining apparatus in the simultaneous localization and mapping system, and a rotation matrix of the key frame uj to the key frame ui comprises:
   calculating a product of the intrinsic matrix, the rotation matrix, an inverse matrix of the intrinsic matrix, and the key point coordinates of the key frame uj; and
   determining the plurality of parallaxes corresponding to the target three-dimensional space point after the preprocessing based on a difference between the key point coordinates of the key frame ui and the product.

4. The method according to claim 1, wherein determining the relative reprojection error based on the reprojection error and a maximum parallax corresponding to the target three-dimensional space point after preprocessing comprises:
   calculating a ratio of the reprojection error to the maximum parallax; and
   determining the ratio as the relative reprojection error.

5. The method according to claim 1, wherein determining the reprojection error based on the target three-dimensional space point comprises:
   determining a position obtained by projecting the target three-dimensional space point; and
   determining the reprojection error based on the position obtained by the projection.

6. The method according to claim 1, wherein performing back-end optimization to the simultaneous localization and mapping system based on the relative reprojection error comprises:
   deciding whether the relative reprojection error reaches a predetermined error threshold or not; and
   if the relative reprojection error does not reach the predetermined error threshold, reperforming the act of determining the target three-dimensional space point in the three-dimensional space points of a plurality of key frames located by the simultaneous localization and mapping system, so as to cause the relative reprojection error to reach the predetermined error threshold, and performing the back-end optimization to the simultaneous localization and mapping system based on the relative reprojection error.

7. The method according to claim 1, wherein before the determining a target three-dimensional space point in three-dimensional space points of a plurality of key frames located by a simultaneous localization and mapping system, the method further comprises:
   initializing the simultaneous localization and mapping system.

8. The method according to claim 7, wherein initializing the simultaneous localization and mapping system comprises:
   obtaining a predetermined number of continuous frame images, and performing the preprocessing to the predetermined number of continuous frame images;
   screening, with a pre-built adaptive-size sliding window, initial key frames in the predetermined number of continuous frame images with the influence of rotation removed, the initial key frame comprising the plurality of key frames; and performing simultaneous localization and mapping initialization based on the plurality of key frames.

9. The method according to claim 8, wherein performing simultaneous localization and mapping initialization based on the plurality of key frame comprises:

determining relative poses of a first key frame and a last key frame in the plurality of key frames;

obtaining three-dimensional space points of respective key frames in the plurality of key frames based on the relative poses of the first key frame and the last key frame;

determining relative poses of respective key frames in the plurality of key frames based on the relative poses of the first key frame and the last key frame, and the three-dimensional space points of respective key frames in the plurality of key frames; and establishing an initial map based on the three-dimensional space points of respective key frames in the plurality of key frames and the relative poses of respective key frames in the plurality of key frames.

10. A device for back-end optimization of simultaneous localization and mapping, comprising:

a processor;

a memory; and a computer program;

wherein the computer program is stored in the memory and is configured to be executed by the processor, the computer program comprising instructions for performing operations comprising:

determining a target three-dimensional space point in three-dimensional space points of a plurality of key frames located by a simultaneous localization and mapping system, determining a reprojection error based on the target three-dimensional space point, determining a relative reprojection error based on the reprojection error and a maximum parallax corresponding to the target three-dimensional space point after preprocessing, the preprocessing comprising an operation of removing influence of rotation; and performing back-end optimization to the simultaneous localization and mapping system based on the relative reprojection error.

11. The device according to claim 10, wherein the operations further comprise:

before the determining a relative reprojection error based on the reprojection error and a maximum parallax corresponding to the target three-dimensional space point after preprocessing, further comprising:

determining a plurality of target key frames corresponding to the target three-dimensional space point;

determining a plurality of parallaxes corresponding to the target three-dimensional space point after the preprocessing based on key point coordinates of a key frame ui, key point coordinates of a key frame uj, an intrinsic matrix of an image obtaining apparatus in the simultaneous localization and mapping system, and a rotation matrix of the key frame uj to the key frame ui, wherein the key frames ui and uj are any two of the plurality of target key frames, i=1, 2, . . . m, j=1, 2, . . . m, and m is equal to the number of the plurality of target key frames; and determining the maximum parallax from the plurality of parallaxes corresponding to the target three-dimensional space point after the preprocessing.

12. The device according to claim 11, wherein determining the plurality of parallaxes comprises:

calculating a product of the intrinsic matrix, the rotation matrix, an inverse matrix of the intrinsic matrix, and the key point coordinates of the key frame uj; and determining the plurality of parallaxes corresponding to the target three-dimensional space point after the preprocessing based on a difference between the key point coordinates of the key frame ui and the product.

13. The device according to claim 10, wherein determining the relative reprojection error comprises:

calculating a ratio of the reprojection error to the maximum parallax; and determining the ratio as the relative reprojection error.

14. The device according to claim 10, wherein determining the reprojection error based on the target three-dimensional space point comprises:

determining a position obtained by projecting the target three-dimensional space point; and determining the reprojection error based on the position obtained by the projection.

15. The device according to claim 10, wherein performing back-end optimization to the simultaneous localization and mapping system comprises:

deciding whether the relative reprojection error reaches a predetermined error threshold or not; and if the relative reprojection error does not reach the predetermined error threshold, reperforming the act of determining the target three-dimensional space point in the three-dimensional space points of a plurality of key frames located by the simultaneous localization and mapping system, so as to cause the relative reprojection error to reach the predetermined error threshold, and performing the back-end optimization to the simultaneous localization and mapping system based on the relative reprojection error.

16. The device according to claim 10, wherein the operations further comprise:

before the determining the target three-dimensional space point in three-dimensional space points of a plurality of key frames located by a simultaneous localization and mapping system, initializing the simultaneous localization and mapping system.

17. The device according to claim 16, wherein initializing the simultaneous localization and mapping system comprises:

obtaining a predetermined number of continuous frame images, and performing the preprocessing to the predetermined number of continuous frame images;

screening, with a pre-built adaptive-size sliding window, initial key frames in the predetermined number of continuous frame images with the influence of rotation removed, the initial key frame comprising the plurality of key frames; and performing simultaneous localization and mapping initialization based on the plurality of key frames.

18. The device according to claim 17, wherein performing simultaneous localization and mapping initialization comprises:

determining relative poses of a first key frame and a last key frame in the plurality of key frames;

obtaining three-dimensional space points of respective key frames in the plurality of key frames based on the relative poses of the first key frame and the last key frame;

determining relative poses of respective key frames in the plurality of key frames based on the relative poses of the first key frame and the last key frame, and the three-dimensional space points of respective key frames in the plurality of key frames; and establishing an initial map based on the three-dimensional space points of respective key frames in the plurality of key frames and the relative poses of respective key frames in the plurality of key frames.

19. A non-transitory computer-readable storage medium storing a computer program, wherein when executed by a processor, causes the processor to:

determine a target three-dimensional space point in three-dimensional space points of a plurality of key frames located by a simultaneous localization and mapping system;

determine a reprojection error based on the target three-dimensional space point;

determine a relative reprojection error based on the reprojection error and a maximum parallax corresponding to the target three-dimensional space point after preprocessing, the preprocessing comprising an operation of removing influence of rotation; and perform back-end optimization to the simultaneous localization and mapping system based on the relative reprojection error.

20. The non-transitory computer-readable storage medium of claim 19, wherein the processor is further caused to:

before the determining a relative reprojection error based on the reprojection error and a maximum parallax corresponding to the target three-dimensional space point after preprocessing, determine a plurality of target key frames corresponding to the target three-dimensional space point;

determine a plurality of parallaxes corresponding to the target three-dimensional space point after the preprocessing based on key point coordinates of a key frame $u_i$, key point coordinates of a key frame $u_j$, an intrinsic matrix of an image obtaining apparatus in the simultaneous localization and mapping system, and a rotation matrix of the key frame $u_j$ to the key frame $u_i$, wherein the key frames $u_i$ and $u_j$ are any two of the plurality of target key frames, $i=1, 2, \ldots m$, $j=1, 2, \ldots m$, and m is equal to the number of the plurality of target key frames; and determine the maximum parallax from the plurality of parallaxes corresponding to the target three-dimensional space point after the preprocessing.

* * * * *